No. 638,482. Patented Dec. 5, 1899.
N. W. STORER.
ELECTRIC GENERATOR OR MOTOR.
(Application filed July 28, 1899.)

(No Model.)

WITNESSES:
Ethan F. Dodds
H. C. Tener

INVENTOR
Norman W. Storer
BY
Wesley G. Carr
ATTORNEY.

UNITED STATES PATENT OFFICE.

NORMAN W. STORER, OF EDGEWOOD PARK, PENNSYLVANIA, ASSIGNOR TO THE WESTINGHOUSE ELECTRIC AND MANUFACTURING COMPANY, OF PENNSYLVANIA.

ELECTRIC GENERATOR OR MOTOR.

SPECIFICATION forming part of Letters Patent No. 638,482, dated December 5, 1899.

Application filed July 28, 1899. Serial No. 725,405. (No model.)

*To all whom it may concern:*

Be it known that I, NORMAN W. STORER, a citizen of the United States, residing at Edgewood Park, in the county of Allegheny and State of Pennsylvania, have invented a new and useful Improvement in Electric Generators or Motors, (Case No. 843,) of which the following is a specification.

My invention relates to electric generators or motors, and particularly to the armatures of such machines.

The object of my invention is to provide an armature with a winding so constructed and assembled as to afford a maximum useful magnetic effect without oversaturating the iron between the core-slots or increasing the size of the armature-core beyond satisfactory limits.

A further object of my invention is to so arrange and connect the armature-coils to the commutator-bars as to reduce the losses on account of eddy-currents to a minimum.

Figure 1:
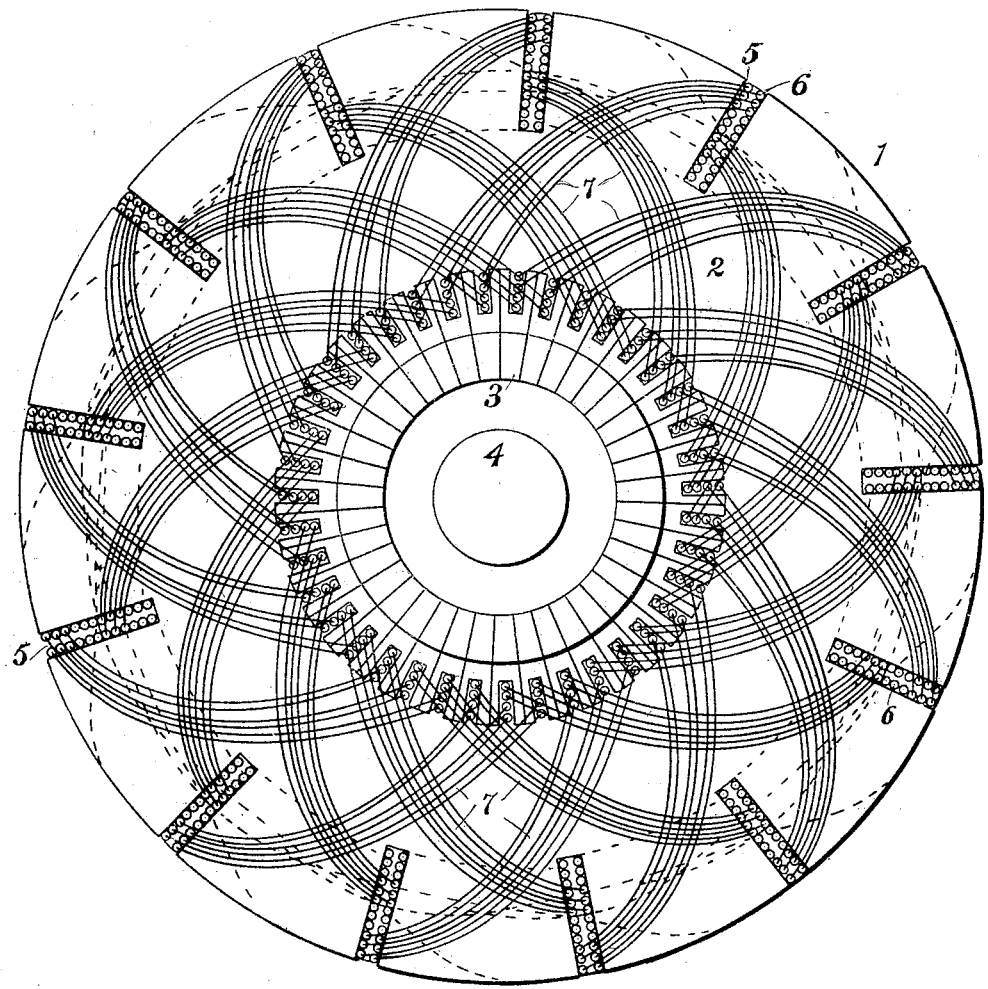
Figure 2:
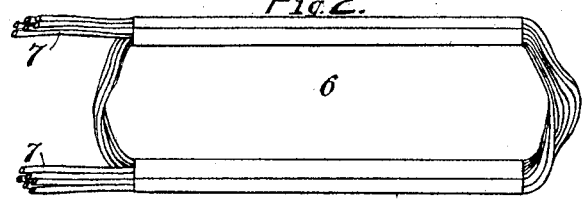

In the accompanying drawings, Figure 1 is an end elevation of an armature and commutator embodying my invention, the illustration being, however, in part diagrammatic in character; and Fig. 2 is a plan view of a coil embodied in the construction shown in Fig. 1.

It has been usual in constructing armatures for direct-current generators and motors prior to my invention to so locate the turns of wire in the core-slots that the wires in each slot are arranged in a plurality of layers, each layer comprising two or more wires placed side by side. In connecting such coils to the commutator-bars it has been usual, however, to either connect each lead from each slot to a separate commutator-bar, or, if two or more leaks were connected in multiple, to select leaks for multiple connection which lie one above the other in the slot.

By my present invention I propose to connect two or more conductors from each slot in multiple to a commutator-bar; but instead of the practice above referred to I connect two or more conductors lying side by side in the slot to the same commutator-bar, and thereby materially reduce the losses due to eddy-currents, since the local magnetic flux intercepted by the wires connected in parallel is only about one-half what it would be if such wires were located in the same radial plane.

By my present arrangement I am also able to employ deep core-slots, and thus utilize a large number of turns of wire per slot without oversaturating the iron between the slots and without increasing the dimensions of the armature beyond satisfactory limits.

Referring to the details of construction illustrated in the drawings, the armature 1 has a laminated core 2 and a commutator-cylinder 3, as is usual in such constructions, the two being mounted upon and suitably fastened to a shaft 4. The armature-core slots 5 (shown in the drawings) are much fewer in number than would be employed in practice, the less number being shown in order to avoid confusion. The winding for the armature I have shown as made up of twice as many coils 6 as there are slots, one side of each coil being located in the bottom of a slot and the other side being located in the top of another slot, and each coil spanning three spaces or teeth.

The term "coil" is for convenince of description here used to designate the mechanical structure or formation and without special reference to the electrical relation existing among the several wires or turns constituting the armature-winding.

Each coil 6 is constructed by first winding single-layer coils of the desired form and number of turns in a suitable former or mold, then placing two or more of these single-layer coils together side by side and suitably insulating the combined structure. Each single-layer coil may be formed of either a single strand or a plurality of strands of wire, as may be found convenient or desirable. The specific coil shown in the drawings is formed of three strands of substantially the same length, which are wound or laid in a mold of the proper form at the same time—*i. e.*, in the same way that a single strand would be wound or laid. It follows, therefore, that each single-layer coil has three commutator ends or leads 7 projecting from each side and that the completed coil 6 has six of such leads at each side. Each two of the leads 7 that are side by side in the slot are connected to a commutator-bar, as is clearly shown in Fig. 1, and the various pairs of leads are so distributed and connected around the commutator as to provide a two-circuit winding, as is well known in the art.

It will be readily understood from the foregoing description and the accompanying illustration that the amount of local magnetic flux across an armature-core slot which is intercepted by wires in multiple is only about one-half of what would be intercepted if these wires were located in a plane transverse to the flux. It will also be seen that coils having the same number of turns and connected to the commutator-bars in the old way would require core-slots of approximately fifty per cent. greater width. Such increase in the width of the slots would necessitate a corresponding increase in the size of the core in order to avoid oversaturation of the iron between the slots. It follows, therefore, that my present invention enables me to employ armatures of a minimum size for a given output of energy.

I desire it to be understood that the coils employed by me may each comprise more than two single-layer coils arranged side by side, if desired, and also that the number of turns per coil and the number of wires or strands wound together may be varied from what is shown, the essential feature being the structure and arrangement of the coils whereby the wires lying side by side in the slots may be connected in multiple to the commutator.

I claim as my invention—

1. In a direct-current generator or motor, an armature having a core provided with slots and a plurality of coils located in said slots, in combination with a commutator to the bars of which armature-leads are connected in multiple, the conductors in each slot which are connected in multiple being located side by side.

2. An armature for direct-current generators or motors having a slotted core and coils having wires located side by side in the core-slots, and a plurality of sets of leads from side-by-side wires in each slot, in combination with a commutator to each of the bars of which sets of leads from corresponding slots are connected.

3. An armature for direct-current generators or motors having a slotted core and a plurality of coils each having a plurality of turns of wire located side by side in the core-slots, and each coil having its sides located respectively in the top and the bottom of separate core-slots, in combination with a commutator and a plurality of leads from each commutator-bar to side-by-side wires in corresponding armature-slots.

In testimony whereof I have hereunto subscribed my name this 26th day of July, 1899.

NORMAN W. STORER.

In presence of—
WESLEY G. CARR,
HUBERT C. TENER.